United States Patent
Jung

(10) Patent No.: US 9,651,015 B2
(45) Date of Patent: May 16, 2017

(54) APPARATUS AND METHOD FOR PREVENTING SUDDEN START OF AUTOMATIC TRANSMISSION VEHICLE

(71) Applicant: HYUNDAI MOTOR COMPANY, Seoul (KR)

(72) Inventor: Dogeun Jung, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 146 days.

(21) Appl. No.: 14/752,569

(22) Filed: Jun. 26, 2015

(65) Prior Publication Data
US 2016/0160831 A1   Jun. 9, 2016

(30) Foreign Application Priority Data
Dec. 4, 2014   (KR) .................. 10-2014-0172870

(51) Int. Cl.
G06G 7/00   (2006.01)
F02N 11/10   (2006.01)
F02N 11/08   (2006.01)
B60T 7/12   (2006.01)

(52) U.S. Cl.
CPC .......... F02N 11/103 (2013.01); B60T 7/122 (2013.01); F02N 11/0803 (2013.01); B60T 2260/04 (2013.01)

(58) Field of Classification Search
CPC .... F02N 11/103; F02N 11/0803; B60T 7/122; B60T 2260/04; F02D 41/22
See application file for complete search history.

(56) References Cited

U.S. PATENT DOCUMENTS

| | | | | |
|---|---|---|---|---|
| 2003/0089326 A1* | 5/2003 | Ujifusa | ............... | F02N 11/0814 123/179.4 |
| 2013/0269644 A1* | 10/2013 | Arai | .................. | F02N 15/00 123/179.3 |
| 2013/0325275 A1* | 12/2013 | Kaita | ................... | F16H 61/12 701/63 |
| 2014/0018974 A1* | 1/2014 | Okita | ................... | B60W 30/20 701/1 |

FOREIGN PATENT DOCUMENTS

| | | |
|---|---|---|
| JP | 2003-175747 A | 6/2003 |
| JP | 2008-213648 A | 9/2008 |
| JP | 5040789 B2 | 10/2012 |
| KR | 10-2001-0035591 A | 5/2001 |
| KR | 10-2002-0055041 A | 7/2002 |
| KR | 10-2012-0001370 A | 1/2012 |
| KR | 10-2014-0032119 A | 3/2014 |
| KR | 10-2015-0059327 A | 6/2015 |

* cited by examiner

*Primary Examiner* — David J Hlavka
(74) *Attorney, Agent, or Firm* — McDermott Will & Emery LLP

(57) ABSTRACT

A method for preventing a sudden start of an automatic transmission vehicle includes detecting data for determining whether a sudden start condition is satisfied; determining whether a shift stage is an N stage or a P stage when an engine runs. Whether the sudden start condition is satisfied is determined based on the data when the shift stage is the N stage or the P stage when the engine runs. An engine torque is limited below a predetermined torque, and a brake is operated when the sudden start condition is satisfied.

13 Claims, 4 Drawing Sheets

APPARATUS AND METHOD FOR PREVENTING SUDDEN START OF AUTOMATIC TRANSMISSION VEHICLE

CROSS-REFERENCE TO RELATED APPLICATION

This application claims the benefit of priority to Korean Patent Application No. 10-2014-0172870 filed in the Korean Intellectual Property Office on Dec. 4, 2014, the entire content of which is incorporated herein by reference.

TECHNICAL FIELD

The present disclosure relates to an apparatus and a method for preventing a sudden start of an automatic transmission vehicle. More particularly, the present disclosure relates to an apparatus and a method for preventing a sudden start of an automatic transmission vehicle by limiting an engine torque and operating a brake.

BACKGROUND

Generally, a vehicle has a transmission which receives power generated from an engine to control a driving torque. There are various types of transmissions, for example, a manual transmission, an automatic transmission, and a continuously variable transmission. The automatic transmission is generally used among these in recent years.

The automatic transmission includes a torque converter instead of a clutch which transfers or intercepts power of an engine, so that a vehicle with the automatic transmission does not have a clutch pedal. Thus, the automatic transmission vehicle can control a vehicle speed by using only an accelerator pedal and a brake pedal. However, determination of power delivery such as a driving (D stage), reversing (R stage), neutral (N stage), and park (P stage) should be determined by a driver in the automatic transmission vehicle.

Therefore, the driver operates a shift lever from the N stage to the D stage or an R stage such that the automatic transmission vehicle is shifted and driven. However, if the driver operates the shift lever from the N stage to the D stage or the R stage while pushing the accelerator pedal instead of the brake pedal by mistake in a state where the vehicle stops, a sudden start of the automatic transmission vehicle may be generated. Further, if the driver pushes the accelerator pedal harder, more dangerous sudden start may be generated.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a method for preventing a sudden start of an automatic transmission vehicle having advantages of preventing the sudden start caused by mistake of a driver by limiting an engine torque and operating a brake.

According to an exemplary embodiment of the present inventive concept, a method for preventing a sudden start of an automatic transmission vehicle includes detecting data for determining whether the sudden start condition is satisfied. Whether a shift stage is an N stage or a P stage is determined when an engine runs. Whether the sudden start condition is satisfied is determined based on the data when the shift stage is the N stage or the P stage in the state where the engine runs. An engine torque is limited below a predetermined torque and a brake is operated when the sudden start condition is satisfied.

The data may include information on at least one of a position value of an accelerator pedal, a shift stage of the vehicle, an engine speed, a wheel speed, and a vehicle speed.

The step of determining whether the sudden start condition is satisfied may include comparing a vehicle speed with a predetermined speed. An engine speed is compared with a first predetermined value. A position value of an accelerator pedal is compared with a second predetermined value. Whether a predetermined time elapses is determined. Whether a shift stage is changed from the N stage or the P stage to a D stage or an R stage is determined.

The sudden start condition may be satisfied when the vehicle speed is smaller than the predetermined speed, the engine speed is greater than or equal to the first predetermined value, the position value of the accelerator pedal is greater than or equal to the second predetermined value, and the shift stage is changed from the N stage or the P stage to the D stage or the R stage after the predetermined time elapses.

The method may further include, after limiting the engine torque and operating the brake, releasing the limitation of the engine torque and the operation of the brake when the position value of the accelerator pedal is 0%.

The method may further include, after limiting the engine torque and operating the brake, releasing the limitation of engine torque and the operation of the brake when the predetermined time elapses.

The method may further include, after limiting the engine torque and operating the brake, displaying a warning to a driver.

According to another embodiment of the present inventive concept, an apparatus for preventing a sudden start of an automatic transmission vehicle includes a data detector configured to detect data for determining whether a sudden start condition is satisfied. A controller is configured to limit an engine torque and operate a brake when the sudden start condition is satisfied and an engine runs based on the data.

The data detector may include an accelerator pedal position sensor detecting a position value of an accelerator pedal. A shift stage sensor detects a shift stage of the vehicle. An engine speed sensor detects an engine speed. A wheel speed sensor detects a wheel speed of the vehicle. A vehicle speed sensor detects a vehicle speed.

The controller may determine that the sudden start condition is satisfied when the vehicle speed is smaller than a predetermined speed, the engine speed is greater than or equal to a first predetermined value, the position value of the accelerator pedal is greater than or equal to a second predetermined value, and the shift stage is changed from an N stage or a P stage to a D stage or an R stage after a predetermined time has elapsed.

The controller may release the limitation of the engine torque and the operation of the brake when the position value of the accelerator pedal is 0% after limiting the engine torque and operating the brake.

The controller may release the limitation of the engine torque and the operation of the brake when the predetermined time has elapsed after limiting the engine torque and operating the brake.

The controller may output a signal to display a warning to a driver after limiting the engine torque and operating the brake.

As described above, according to an exemplary embodiment of the present inventive concept, a sudden start of the vehicle by mistake of the driver can be prevented in advance.

Moreover, the driver may check his own mistake and drive normally by displaying a warning to the driver.

DETAILED DESCRIPTION OF THE EMBODIMENTS

In the following detailed description, only certain exemplary embodiments of the present inventive concept have been shown and described, simply by way of illustration. As those skilled in the art would realize, the described embodiments may be modified in various different ways, all without departing from the spirit or scope of the present disclosure.

It is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROM, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

Throughout this specification and the claims which follow, unless explicitly described to the contrary, the word "comprise" and variations such as "comprises" or "comprising" will be understood to imply the inclusion of stated elements but not the exclusion of any other elements.

An exemplary embodiment of the present inventive concept will hereinafter be described in detail with reference to the accompanying drawings.

Figure 1:
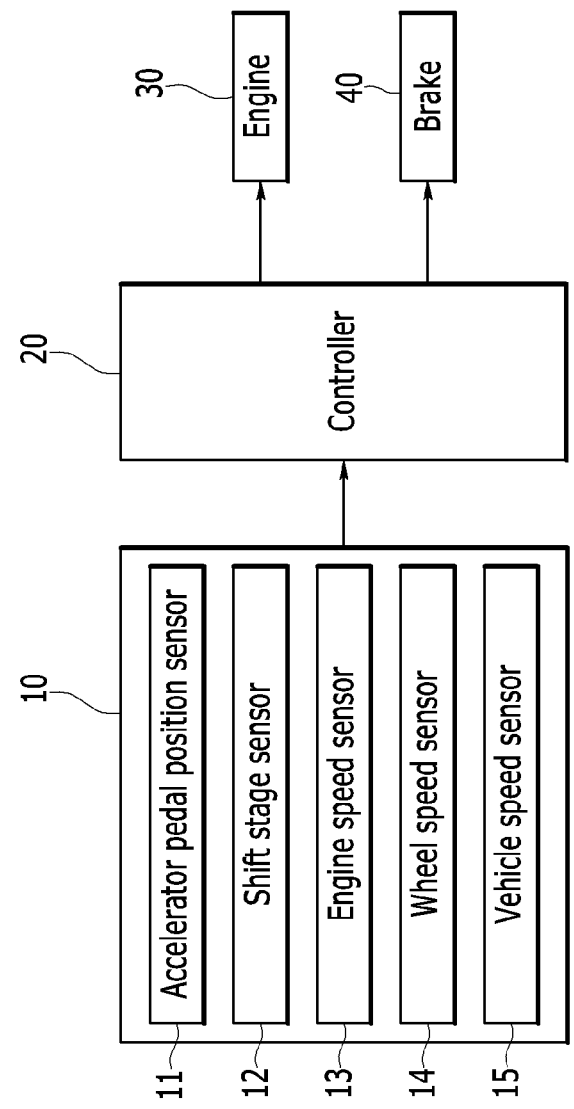
FIG. 1 is a schematic block diagram of an apparatus for preventing a sudden start of an automatic transmission vehicle according to an exemplary embodiment of the present inventive concept.

FIG. 1 is a schematic block diagram of an apparatus for preventing a sudden start of an automatic transmission vehicle according to an exemplary embodiment of the present inventive concept.

As shown in FIG. 1, an apparatus for preventing a sudden start of an automatic transmission vehicle according to an exemplary embodiment of the present inventive concept includes a data detector 10, a controller 20, an engine 30, and a brake 40.

The data detector 10 detects data for determining whether a sudden start condition is satisfied, the data detected by the data detector 10 is transmitted to the controller 20. The data detector 10 includes an accelerator pedal position sensor 11, a shift stage sensor 12, an engine speed sensor 13, a wheel speed sensor 14, and a vehicle speed sensor 15.

The accelerator pedal position sensor 11 detects a degree at which a driver pushes an accelerator pedal. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake pipe may be used instead of the accelerator pedal position sensor 11. Therefore, in this specification and the scope of the appended claims, the accelerator pedal position sensor 11 should include the throttle valve position sensor, and the position value of the accelerator pedal should be understood to be an opening value of the throttle valve.

The shift stage sensor 12 detects a shift stage that is currently engaged.

The engine speed sensor 13 detects a rotational speed of the engine 30.

The wheel speed sensor 14 detects a wheel rotational speed of the vehicle, and is mounted at a wheel of the vehicle. The wheel speed sensor 14 may control a brake hydraulic pressure when the wheel of the vehicle slips according to quick braking.

The vehicle speed sensor 15 detects a vehicle speed, and is mounted at a transmission of the vehicle. The vehicle speed may be calculated based on a signal received by the wheel speed sensor 14.

The controller 20 limits an engine torque and operates the brake 40 when a sudden start condition is satisfied when the engine 20 runs based on the data detected by the data detector 10.

The controller 20 may determine that the sudden start condition is satisfied when the vehicle speed is smaller than a predetermined speed, the engine speed is greater than or equal to a first predetermined value, the position value of the accelerator pedal is greater than or equal to a second predetermined value, and the shift stage is changed from an N stage or a P stage to a D stage or a R stage after a predetermined time has elapsed.

In addition, the controller 20 may release a limitation of the engine torque and the operation of the brake when the position value of the accelerator pedal is 0% or the predetermined time has elapsed after limiting the engine torque and operating the brake. The controller 20 may output a signal to display a warning to a driver after limiting the engine torque and operating the brake.

The controller 20 may be implemented as at least one processor operated by a predetermined program, and the predetermined program may be programmed in order to perform each step of a method of preventing a sudden start for an automatic transmission vehicle according to the present disclosure.

Various embodiments described herein may be implemented within a recording medium that may be read by a computer or a similar device by using software, hardware, or a combination thereof, for example.

According to hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions.

According to software implementation, embodiments such as procedures and functions described in the present embodiments may be implemented by separate software modules. Each of the software modules may perform one or more functions and operations described in the present disclosure. A software code may be implemented by a software application written in an appropriate program language.

Hereinafter, a method of preventing a sudden start for an automatic transmission vehicle according to an exemplary embodiment of the present inventive concept will be described in detail with reference to FIGS. 2 to 4.

Figure 2:
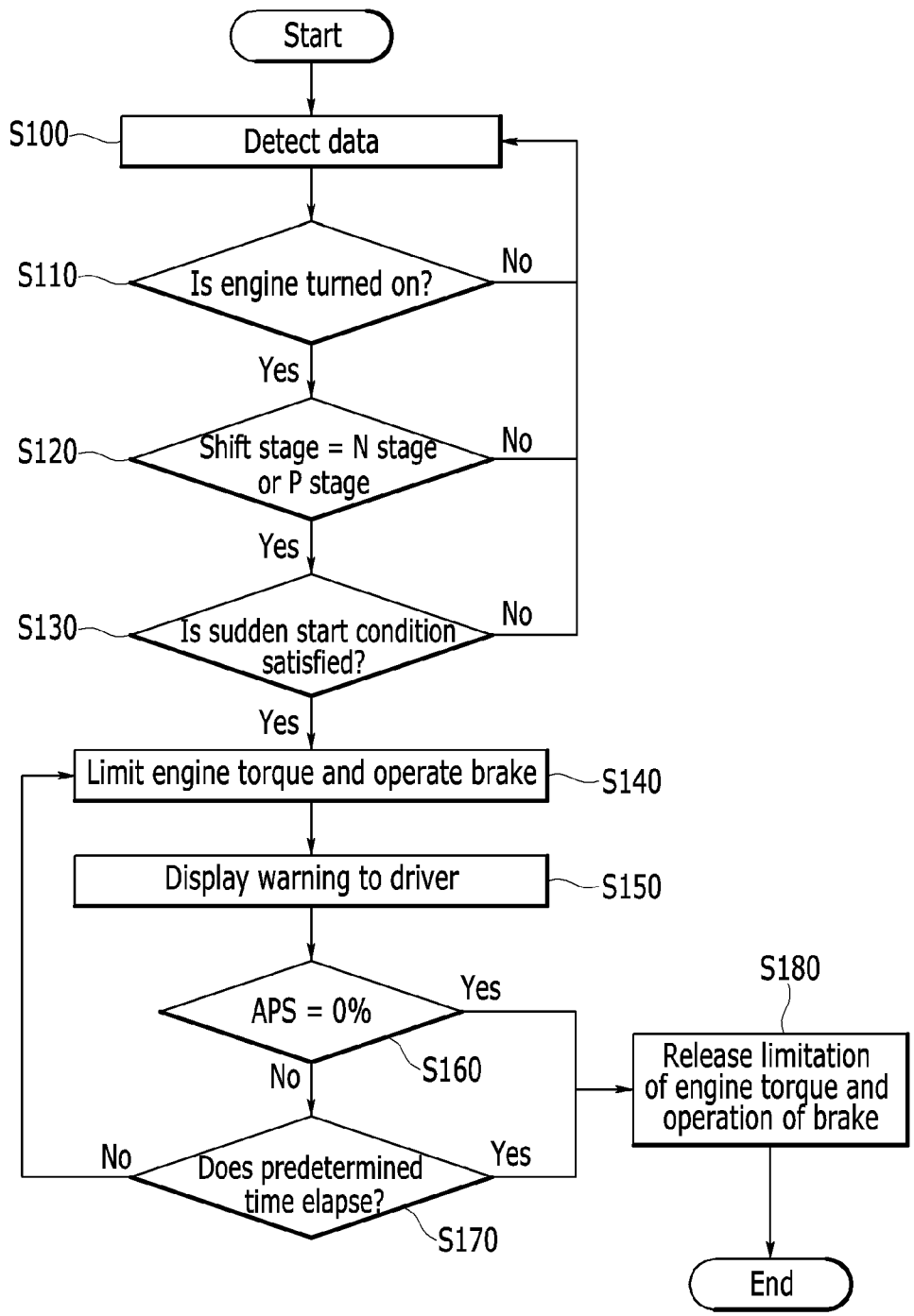
FIG. 2 is a flowchart showing a method for preventing a sudden start of an automatic transmission vehicle according to an exemplary embodiment of the present inventive concept.

FIG. 2 is a flowchart showing a method of preventing a sudden start for an automatic transmission vehicle according to an exemplary embodiment of the present inventive concept.

As shown in FIG. 2, a method for preventing a sudden start of an automatic transmission vehicle according to an exemplary embodiment of the present inventive concept starts with detecting data for determining whether a sudden start condition is satisfied at step S100.

When the data is detected at step S100, the controller 20 determines whether the engine 30 runs at step S110.

When the engine 30 runs on at the step S110, the controller 20 determines whether a current shift stage is an N stage or a P stage at step S120.

That is, the controller 20 may determine that the automatic transmission vehicle is in danger of the sudden start when the current shift stage is the N stage or the P stage. On the other hand, the method of preventing the sudden start for the automatic transmission vehicle according to the exemplary embodiment of the present inventive concept finishes unless the engine starts or the current shift stage is the N stage or the P stage.

When the current shift stage is the N stage or the P stage at the step S120, the controller 20 determines whether the sudden start condition is satisfied based on the data detected by the data detector 10 at step S130.

The determining whether the sudden start condition is satisfied will be described with reference to FIG. 3.

Figure 3:
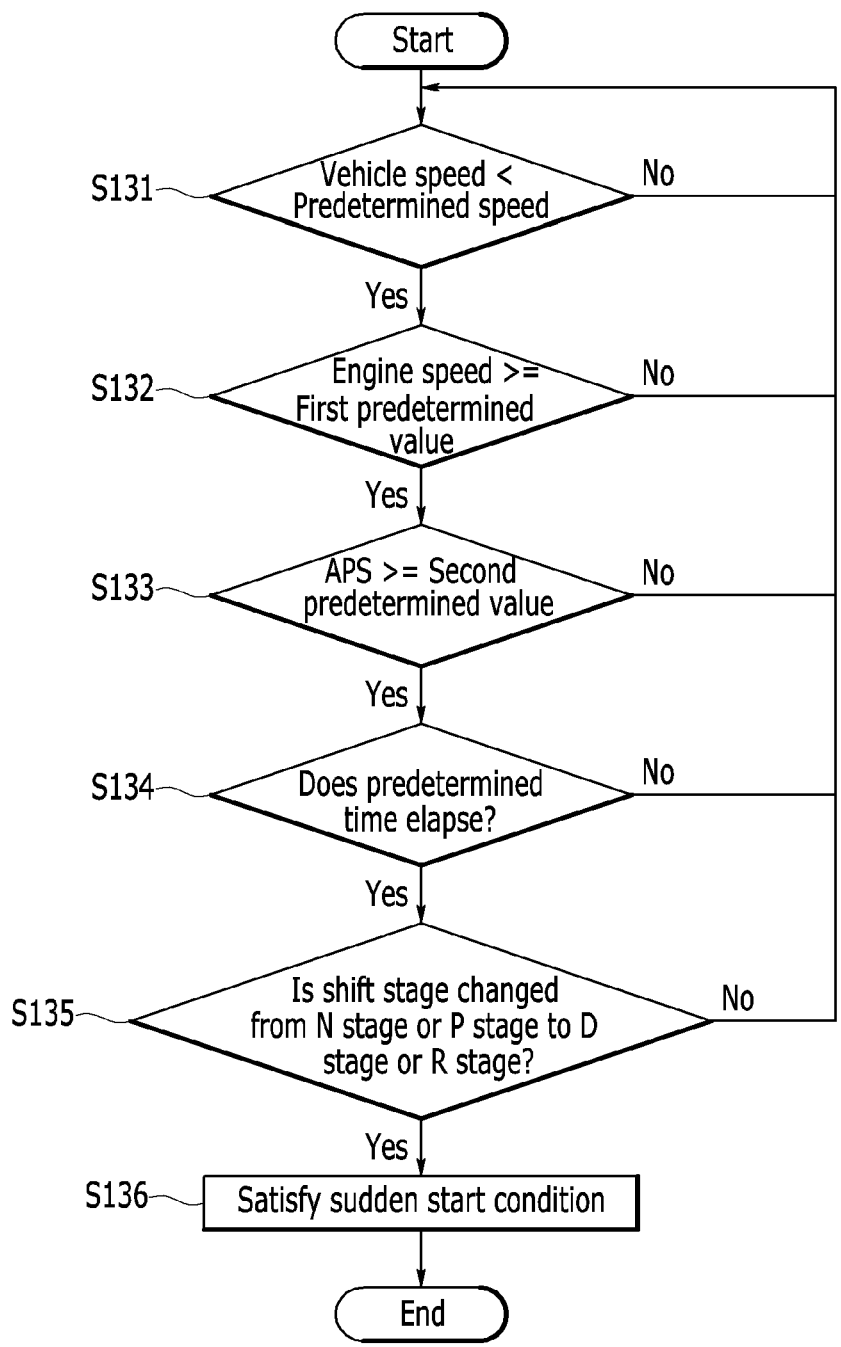
FIG. 3 is a flowchart showing partial steps of a method for determining whether a sudden start condition is satisfied according to an exemplary embodiment of the present inventive concept.

FIG. 3 is a flowchart showing partial steps of a method for determining whether a sudden start condition is satisfied according to an exemplary embodiment of the present inventive concept.

First of all, the controller 20 compares the vehicle speed detected by the vehicle speed sensor 15 with a predetermined speed at step S131.

When the vehicle speed is smaller than the predetermined speed at the step S131, the controller 20 compares the engine speed detected by the engine speed sensor 13 and a first predetermined value at step S132.

When the engine speed is greater than or equal to the first predetermined value at the step S132, the controller 20 compares a position value of the accelerator pedal detected by the accelerator pedal position sensor 11 with a second predetermined value at step S133.

When the position value of the accelerator pedal is greater than or equal to the second predetermined value at step S133, the controller 20 determines whether a predetermined time elapses at step S134. At this time, if the predetermined time is 0, the process proceeds to the next step immediately.

When the predetermined time has elapsed at step S134, the controller 20 determines whether the shift stage of the automatic transmission is changed from the N stage or the P stage to the D stage or the R stage at step S135.

When the shift stage of the automatic transmission is changed from the N stage or the P stage to the D stage or the R stage at the step S135, the controller 20 determines that the sudden start condition is satisfied at step S136.

When the sudden start condition is satisfied by determination from the step S131 to the step S135, the controller 20 limits the engine torque and operates the brake 40 at step S140.

The controller 20 outputs a signal to display a warning to the driver after limiting the engine torque and operating the brake 40 at step S150. That is, the driver may check his own mistake through the warning such that an accident due to the sudden start can be prevented.

After limiting the engine torque and operating the brake 40 at step S140, the controller 20 determines whether the position value of the accelerator pedal is 0% at step S160.

In addition, the controller 20 determines whether the predetermined time elapses after limiting the engine torque and operating the brake 40 at step S170.

When the position value of the accelerator pedal is 0% at the step S160 or the predetermined time has elapsed at the step S170, the controller 20 releases the limitation of the engine torque and the operation of the brake 40 at step S180.

Figure 4:
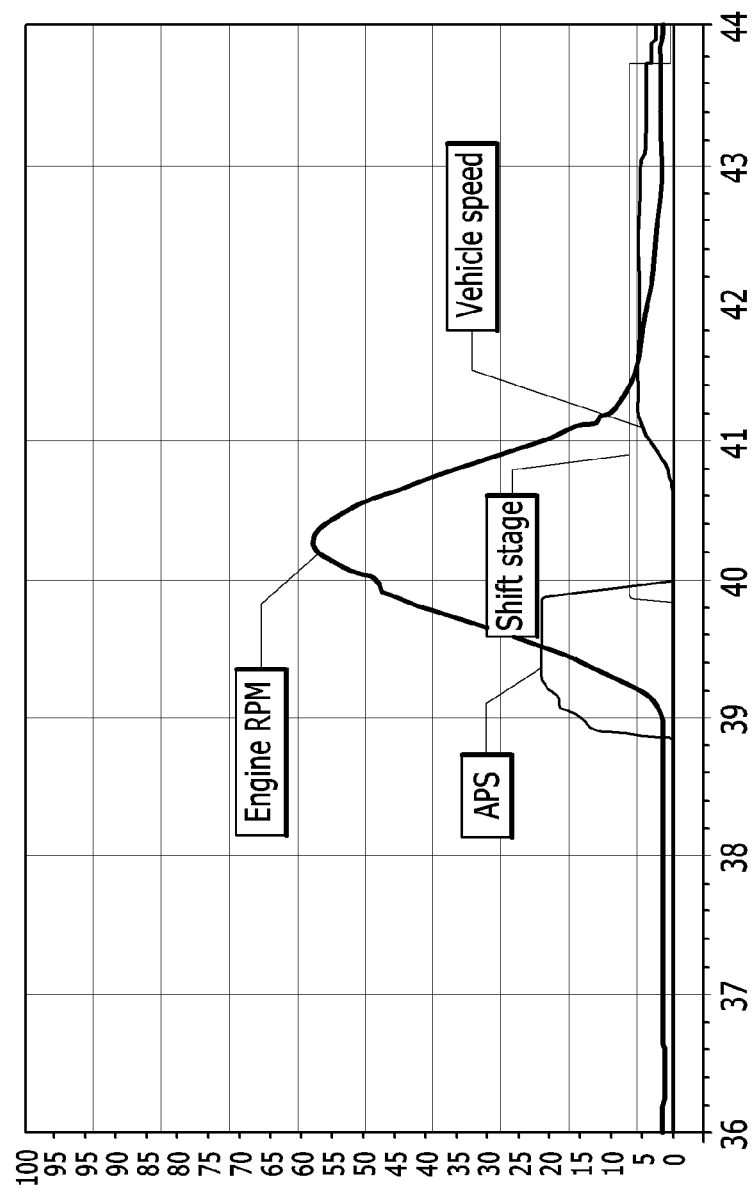
FIG. 4 is a graph showing a result to which a method for preventing a sudden start of an automatic transmission vehicle according to an exemplary embodiment of the present inventive concept is applied.

FIG. 4 is a graph showing a result to which a method for preventing a sudden start of an automatic transmission vehicle according to an exemplary embodiment of the present inventive concept is applied.

As shown in FIG. 4, if the sudden start condition is satisfied because the engine speed is greater than or equal to the first predetermined value and the position value of the accelerator pedal is greater than or equal to the second predetermined value, the vehicle speed is limited by limiting the engine torque and by operating the brake.

As described above, according to the present disclosure, a sudden start of the vehicle by mistake of the driver can be prevented in advance.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A method for preventing a sudden start of an automatic transmission vehicle, the method comprising steps of:
   detecting data for determining whether the sudden start condition is satisfied;
   determining whether a shift stage is a neutral (N) stage or a parking (P) stage when an engine operates;
   determining whether the sudden start condition is satisfied based on the data when the shift stage is the N stage or the P stage when the engine operates; and
   limiting an engine torque below a predetermined torque and operating a brake when the sudden start condition is satisfied.

2. The method of claim 1, wherein the data includes information on at least one of a position value of an accelerator pedal, a shift stage of the vehicle, an engine speed, a wheel speed, and a vehicle speed.

3. The method of claim 1, wherein the step of determining whether the sudden start condition is satisfied comprises:
comparing a vehicle speed with a predetermined speed;
comparing an engine speed with a first predetermined value;
comparing a position value of an accelerator pedal with a second predetermined value;
determining whether a predetermined time elapses; and
determining whether the shift stage is changed from the N stage or the P stage to a driving (D) stage, or a reverse (R) stage.

4. The method of claim 3, wherein the sudden start condition is satisfied when the vehicle speed is smaller than the predetermined speed, the engine speed is greater than or equal to the first predetermined value, the position value of the accelerator pedal is greater than or equal to the second predetermined value, and the shift stage is changed from the N stage or the P stage to the D stage or the R stage after the predetermined time has elapsed.

5. The method of claim 1, further comprising, after the step of limiting the engine torque:
releasing the limitation of the engine torque and the operation of the brake when the position value of the accelerator pedal is 0%.

6. The method of claim 1, further comprising, after the step of limiting the engine torque:
releasing the limitation of the engine torque and the operation of the brake after a predetermined time elapses.

7. The method of claim 1, further comprising, after limiting the engine torque and operating the brake:
displaying a warning to a driver.

8. An apparatus for preventing a sudden start of an automatic transmission vehicle, the apparatus comprising:
a data detector configured to detect data for determining whether a sudden start condition is satisfied; and
a controller configured to limit an engine torque and operate a brake when a sudden start condition is satisfied when an engine runs based on the data.

9. The apparatus of claim 8, wherein the data detector comprises:
an accelerator pedal position sensor detecting a position value of an accelerator pedal;
a shift stage sensor detecting a shift stage of the vehicle;
an engine speed sensor detecting an engine speed;
a wheel speed sensor detecting a wheel speed of the vehicle; and
a vehicle speed sensor detecting a vehicle speed.

10. The apparatus of claim 8, wherein the controller determines that the sudden start condition is satisfied when a vehicle speed is smaller than a predetermined speed, an engine speed is greater than or equal to a first predetermined value, a position value of an accelerator pedal is greater than or equal to a second predetermined value, and the shift stage is changed from an N stage or a P stage to a D stage or an R stage after a predetermined time elapses.

11. The apparatus of claim 8, wherein the controller releases the limitation of the engine torque and the operation of the brake when a position value of an accelerator pedal is 0% after limiting the engine torque and operating the brake.

12. The apparatus of claim 8, wherein the controller releases the limitation of the engine torque and the operation of the brake when a predetermined time elapses after limiting the engine torque and operating the brake.

13. The apparatus of claim 8, wherein the controller outputs a signal to display a warning to a driver after limiting the engine torque and operating the brake.

* * * * *